April 25, 1950 M. J. MILLER 2,505,296
RECIPROCATING CUTTER POWER LAWN MOWER
Filed Feb. 18, 1948 2 Sheets-Sheet 1

INVENTOR.
MATHIAS. J. MILLER
BY
Saulsbury + Russell
ATTORNEYS

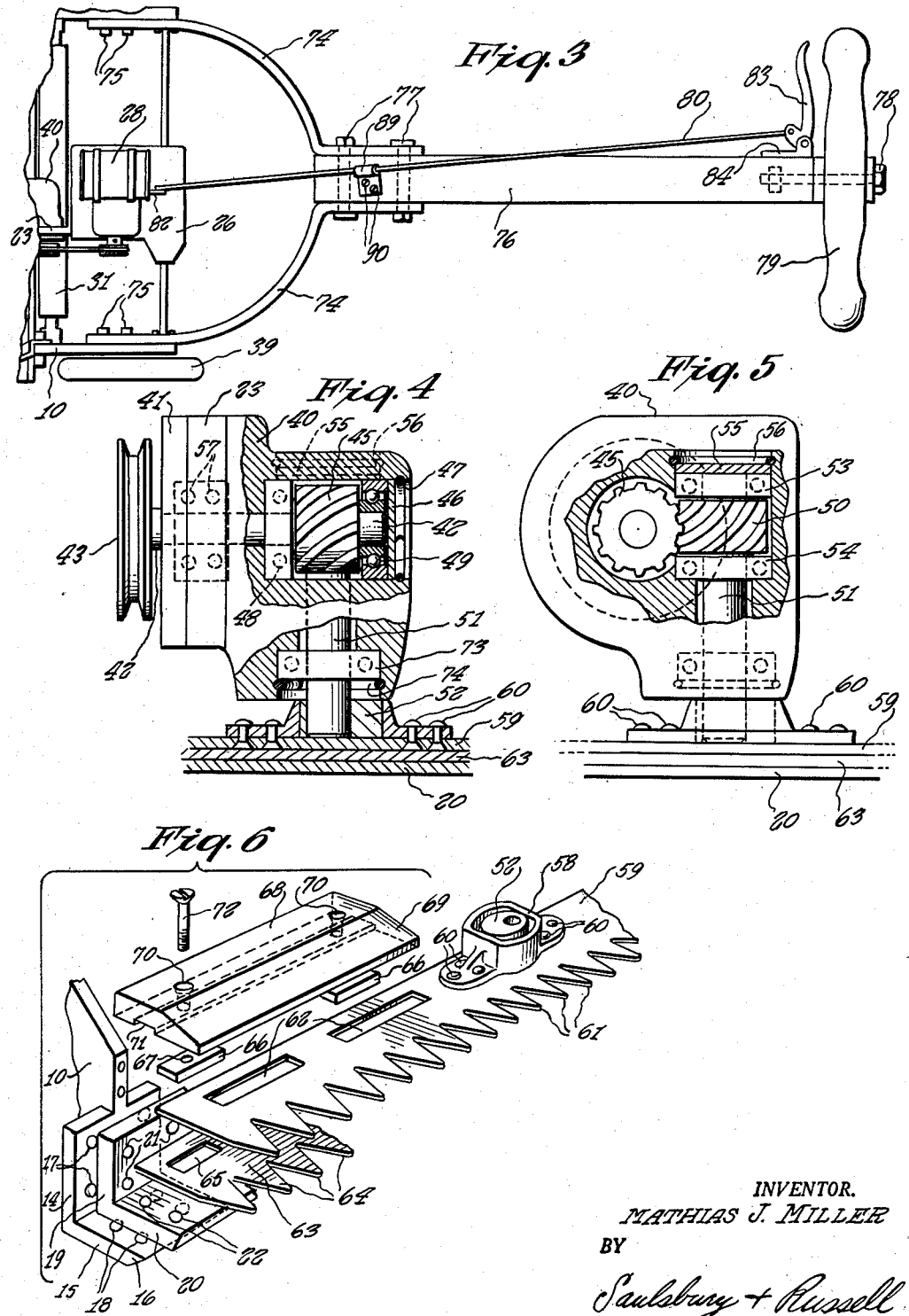

Patented Apr. 25, 1950

2,505,296

UNITED STATES PATENT OFFICE 2,505,296

RECIPROCATING CUTTER POWER LAWN MOWER

Mathias J. Miller, Evansville, Ind.

Application February 18, 1948, Serial No. 9,221

6 Claims. (Cl. 56—26.5)

The present invention relates to lawn mowers and it consists in the combinations, constructions and arrangements of parts herein described and claimed.

It is an object of the present invention to provide a lawn mower having a motor-powered cutting mechanism which is simple, efficient and effective in its operation and easily controlled by the operator thereof.

Another object of the invention is the provision in a lawn mower of novel and efficient means for guiding blades of grass and the like toward the cutting blades.

A further object of the invention is the provision of novel side buffers for a lawn mower.

A still further object of the invention is the provision of a novel arrangement of a pair of cooperating blades to provide efficient and even severing of grass and the like.

Still another object of the invention is the provision of novel and efficient means for adjusting the position of the cutting blades of a lawn mower with respect to the ground.

Another object of the invention is the provision of a lawn mower which will cut grass as distinguished from a mere "whipping" of grass which takes place with the conventional mower.

A further object of the invention is the provision of a mower which will cleanly and evenly cut grass regardless of its height.

A further object of the invention is the provision of a mower, all of the parts of which are designed for mass production.

Another object of the invention is the provision of a mower of rigid construction but having such simplicity that an operator of small skill may remove or replace the various parts thereof and thus assure the apparatus of an indefinite life.

A further object of the invention is the provision of a lawn mower so designed as to leave minimum wheel marks in a lawn during normal operation.

A still further object of the invention is the provision of a lawn mower which is capable of cutting grass extremely close to curbings, monuments and the like.

Figure 1:
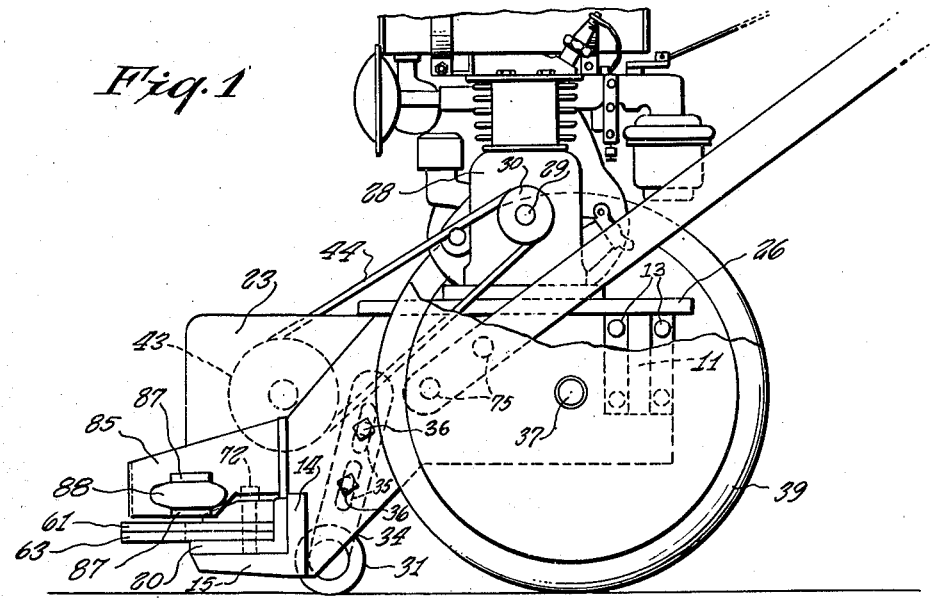
Figure 2:
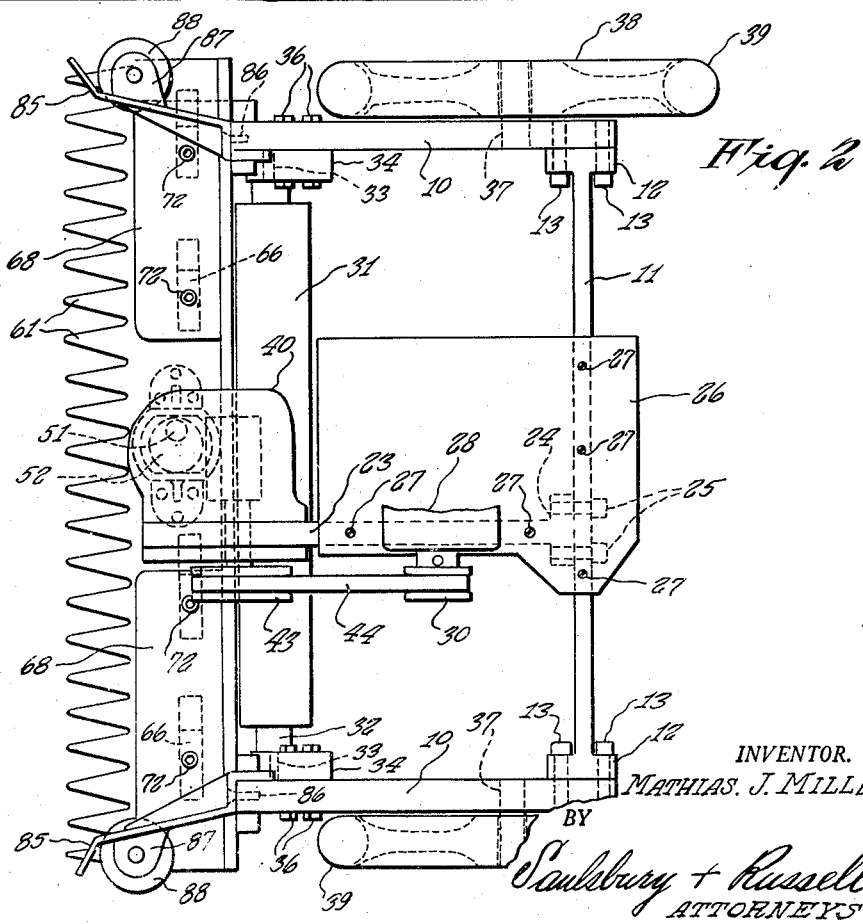

Other and further objects of the invention will become apparent from a reading of the following specification taken in conjunction with the drawings, in which:

Figure 1 is a side elevational view, partly broken away, of an embodiment of the invention, Figure 2 is a fragmentary plan view of Figure 1, Figure 3 is a plan view of a portion of the invention, Figure 4 is an elevational view, partly in section, illustrating certain details of construction, Figure 5 is a view similar to Figure 4 but taken at an angle thereto, and Figure 6 is an exploded fragmentary perspective view illustrating certain details of construction.

Generally, there is provided a lawn mower having a frame to which is attached a yoke which interconnects with an operating handle. The frame is provided with a pair of comparatively large supporting wheels and mounts thereon a a motor of low horsepower which is operatively connected with a laterally slidable blade to reciprocate the same. A stationary cooperating blade is mounted adjacent the movable blade and both blades are provided with cutting teeth. The mower is provided with a pair of outwardly extending guide arms adapted to guide blades of grass and the like to the blades and a revoluble buffer of rubber is positioned upon either side of the frame to protect both the mechanism of the mower and any objects with which the mower might accidentally come in contact.

Referring more particularly to the drawings, there is shown therein a lawn mower having a frame consisting of a pair of side plates 10 interconnected at their rearward ends by a laterally extending brace member 11 having integrally formed flanges 12 connecting the side plates by means of bolts 13.

The forward ends of the side plate 10 are each provided with an integrally formed bracket comprising a vertical wall member 14 and a horizontally and forwardly extending shelf member 15 having an upwardly and forwardly extending lip 16. The wall members 14 are provided with screw openings 17 and the shelf members 15 are provided with screw openings 18.

An L-shaped frame member is formed with a vertical wall 19 and a forwardly extending horizontal wall 20 and is provided with a series of screw openings 21 adjacent either end of its vertical wall 19 and a series of screw openings 22 adjacent either end of its horizontal wall 20. Cap screws (not shown), preferably of the Allen head type, interconnect the L-shaped frame member and the brackets of the side plates through openings 21 and 17, and 22 and 18, respectively.

An intermediate frame plate 23 is provided with a T-head 24 at its rearward end for affixing the same to the brace member 11 by means of bolts 25 and a platform 26 is affixed upon the upper sides of the plate 23 and member 11 by means of screws 27. A motor 28 is mounted in any suitable manner upon the platform 26 and is provided with a drive shaft 29 having a drive pulley 30 mounted thereon.

A roller 31 is provided with reduced portions 32 at either end from which protrude trunnions 33 which are each revolubly mounted in the lower end of an arm 34 which is provided with a pair of slots 35. Bolts 36 are threadably mounted in each of the side plates 10 and pass through the slots 35 to adjustably position the arms 34 and thereby the position of the forward end of the framework of the mower with respect to the ground.

Adjacent the rear ends of the plates 10 in each case a stub shaft 37 extends outwardly and has mounted thereon a wheel 38 having a rubber tire 39.

To the forward end of the plate 23 is affixed a gear housing 40 laterally protruding from which and extending through the plate 23 and a cover plate 41 is a shaft 42 having mounted thereon a driven pulley 43 which is interconnected with the pulley 30 by means of a belt 44. In place of the belt 44 a chain, preferably of the "silent" type, may be utilized.

Interiorly of the housing 40 and affixed to the shaft 42 is a helical gear 45 and access may be had to the gear 45 through a cover 46 held in position by means of a wire clip 47. A race of ball bearings 48 and a like race 49 are provided on either side of the gear 45. A helical gear 50 is enmeshed with the gear 45 and is mounted upon a vertically dependent shaft 51 whose lower end has affixed thereto a cam 52. A ball race 53 and a like ball race 54 are mounted at either side of the gear 50 and access may be had to the gear 50 through a cover 55 held in position by means of a wire clip 56. Two additional ball races 57 surround the shaft 42 within the plates 23 and 41.

The cam 52 is revolubly mounted in an elliptical shuttle member 58 which is rigidly affixed to a movable blade 59 by means of rivets 60 or the like. The blade 59 is provided with a series of V-shaped cutting teeth 61 at its forward end and a plurality of slots 62 are formed longitudinally in the blade 59.

A stationary blade 63 lies upon the shelf member 20 and is provided with a series of cutting teeth 64 and a plurality of slots 65 which slots are relatively shorter in length than the slots 62 and are adapted to snugly receive blocks 66 therein. The blocks are provided with screw openings 67. A pair of cover plates 68 having tapered forward edges 69 are each provided with a pair of vertically extending screw openings 70 and a longitudinally extending groove 71 upon their undersides. Screws 72 are adapted to pass through the openings 70 and 67 and engage openings (not shown) in the shelf member 20. It will be understood that the blocks 66 extend through the openings 62 in the blade 59 and act as guides for the lateral reciprocatory movement of the blade 59.

A ball race 73 is provided for the shaft 51 in the housing 40 and is held in position by means of a spring clip 74.

A pair of yoke members 74 are detachably affixed to the side plates 10 by means of bolts 75 and are engaged with an elongated shank 76 by means of bolts 77 and a bolt 78 holds a handle 79 upon the outer end of the shank. An elongated link 80 interconnects a control lever 82 of the motor 28 and a control lever 83 pivotally mounted upon a bracket 84 which is, in turn, affixed to the upper end of the shank 76, adjacent to the handle 79.

A guide arm 85 extending beyond the outer ends of the teeth 61 and 64 is affixed, by means of screws 86, to the upper forward end of each of the side plates 10 and each of the members 85 is provided with a pair of integrally formed outwardly extending ears 87 between which is revolubly mounted a buffer wheel 88 which is preferably formed of rubber or similar material.

In operation, it will be apparent that the height of the blades 59 and 63 above the ground may be regulated by loosening the bolts 36 and setting the arms 34 in adjusted positions and thereafter tightening the same whereby the roller 31 is raised or lowered as the case may be to support the forward end of the frame in higher or lower positions with respect to the ground. The motor 28 may be readily controlled by the hand lever 83 which is convenient to the hands of the operator and thus the speed of the movable blade 59 may be controlled as the mower is manually moved over the ground in conventional manner. It will be seen that the guide members 85 will gather and direct toward the teeth 61 and 64 grass which may be in the path of the mower and that the reciprocity of the blade 59 over the blade 63 will cause the teeth 61 and 64 to operate in the manner of shears, that is to say they will actually cut the grass which may be in the path of the mower. The buffers 88 will allow for the use of the mower in close quarters and furthermore allow the blades 59 and 63 to very closely approach an object such as a curbing, monument or the like without scarring the same and without injuring the apparatus in any manner. It will also be seen that the interior of the housing 40 may easily be provided with grease whereby to lubricate the moving parts therein and that access may be had to all of the various parts of the mower for the repair or replacement thereof. A guide 89 may be affixed to the lower end of the shank 76 by screws 90 or the like for guiding the link 80.

While but one form of the invention has been shown and described herein, it will be readily apparent to those skilled in the art that many minor modifications may be made without departing from the spirit of the invention or the scope of the appended claims.

What is claimed is:

1. In a lawn mower having a frame, a supporting wheel at each side of the frame and a pair of transversely extending cooperating blades carried at the forward end of the frame, the provision of a guide member extending forwardly and outwardly at either side of the frame to points immediately outwardly of the plane of the outer side of the adjacent supporting wheel.

2. In a lawn mower having a frame, a supporting wheel at each side of the frame and a pair of transversely extending cooperating blades carried at the forward end of the frame, the provision of a vertically disposed flat guide member extending forwardly and outwardly at either side of the frame to points immediately outwardly of the plane of the outer side of the adjacent supporting wheel.

3. In a lawn mower having a frame, a supporting wheel at each side of the frame and a pair of transversely extending cooperating blades carried at the forward end of the frame, the provision of a guide member extending forwardly and outwardly at either side of the frame to points immediately outwardly of the plane of the outer side of the adjacent supporting wheel and a revoluble buffer extending outwardly and horizontally from each of the guide members.

4. In a lawn mower having a frame, a supporting wheel at each side of the frame and a pair of transversely extending cooperating blades carried at the forward end of the frame, the provision of a guide member extending forwardly and outwardly at either side of the forward end of the frame to points immediately outwardly of the plane of the outer side of the adjacent supporting wheel, a pair of ears formed integrally with the outer side of each of the guide members, a wheel revolubly and horizontally mounted in each pair of ears and a resilient covering for the outer periphery of each of the wheels carried by said ears.

5. In a lawn mower having a frame, a supporting wheel at each side of the frame and a pair of transversely extending cooperating blades carried at the forward end of the frame, the provision of a vertically disposed flat guide member extending forwardly and outwardly at either side of the forward end of the frame to points immediately outwardly of the plane of the outer side of the adjacent supporting wheel and a revoluble buffer extending outwardly and horizontally from each of the guide members.

6. In a lawn mower having a frame, a supporting wheel at each side of the frame and a pair of transversely extending cooperating blades carried at the forward end of the frame, the provision of a vertically disposed flat guide member extending forwardly and outwardly at either side of the forward end of the frame to points immediately outwardly of the plane of the outer side of the adjacent supporting wheel, a pair of ears formed integrally with the outer side of each of the guide members, a buffer wheel revolubly and horizontally mounted in each pair of ears and a resilient covering for the outer periphery of each of said buffer wheels.

MATHIAS J. MILLER.

REFERENCES CITED

The following references are of record in the file of this patent:

UNITED STATES PATENTS

| Number | Name | Date |
|---|---|---|
| 1,610,498 | Duckett | Dec. 14, 1926 |
| 1,724,409 | Ott | Aug. 13, 1929 |
| 2,106,033 | Mall | Jan. 18, 1938 |